United States Patent [19]

Lasswell

[11] 3,864,899

[45] Feb. 11, 1975

[54] SPINDLE FOR FRUIT PICKER

[76] Inventor: Fred D. Lasswell, 1111 N. Westshore Blvd., Tampa, Fla. 33607

[22] Filed: Aug. 20, 1973

[21] Appl. No.: 389,972

[52] U.S. Cl. ............................................. 56/328 R
[51] Int. Cl. ............................................. A01g 19/08
[58] Field of Search .......................... 56/328 R, 330

[56] References Cited
UNITED STATES PATENTS

| | | | |
|---|---|---|---|
| 3,222,855 | 12/1965 | Lasswell, Jr. | 56/328 R |
| 3,407,580 | 10/1968 | Murray | 56/328 R |
| 3,458,982 | 8/1969 | Lasswell, Jr. | 56/328 R |
| 3,478,501 | 11/1969 | Patzlaff | 56/330 |
| 3,601,962 | 8/1971 | Townsend | 56/328 R |
| 3,701,242 | 10/1972 | Townsend | 56/328 R |

Primary Examiner—Robert Peshock
Assistant Examiner—J. N. Eskovitz
Attorney, Agent, or Firm—Kenneth T. Snow

[57] ABSTRACT

A fruit picking panel with a certain arrangement of a plurality of parallel disposed rotating spindles and a certain arrangement of a plurality of intermingled parallel disposed stationary spindles for penetrating the branches of a fruit bearing tree. The rotating spindles have single-lobed cam-like elements intermediate the ends thereof to provide maximum openings for permitting the easy penetration of the panel of spindles in and around the branches and the hanging fruit for a minimum of physical damage thereto and thereafter the rotation of the spindles carrying the cams causes the fruit to be gently squeezed between adjacent cams or between a cam and a stationary spindle to spin the fruit free of its attachment to the tree.

7 Claims, 14 Drawing Figures

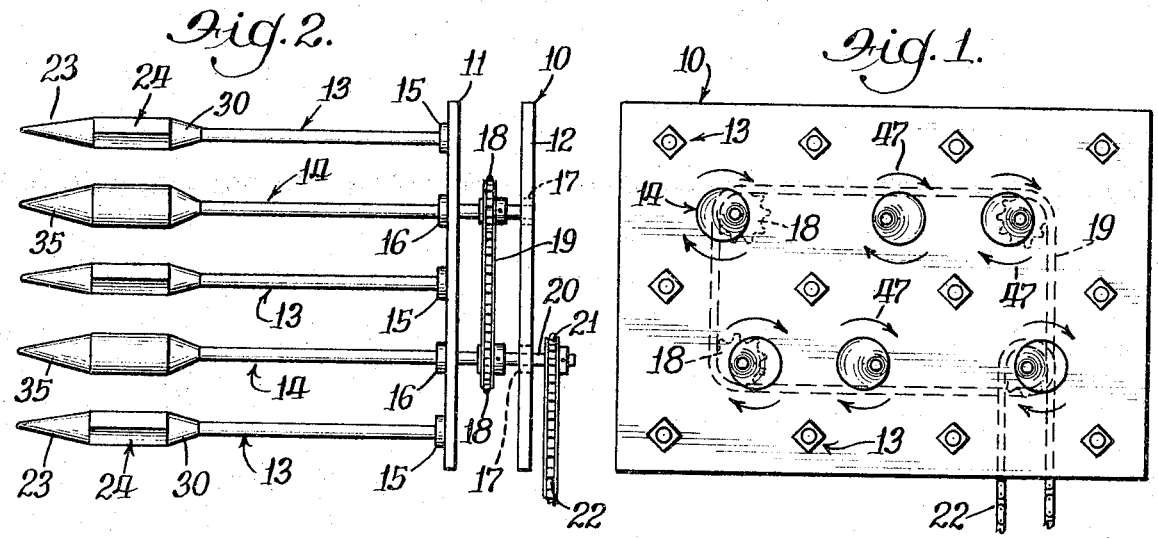
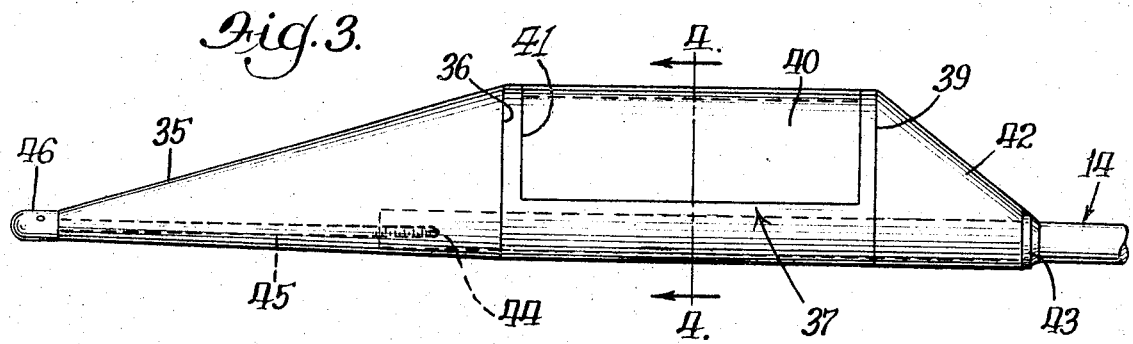
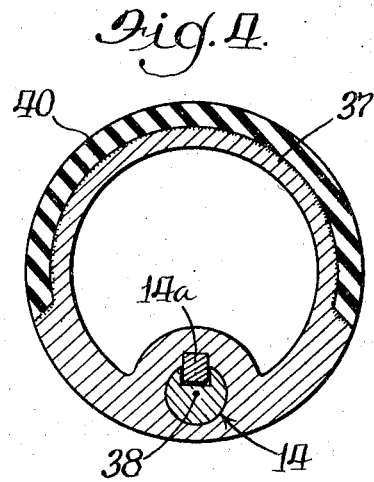
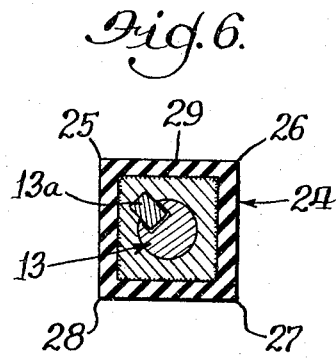
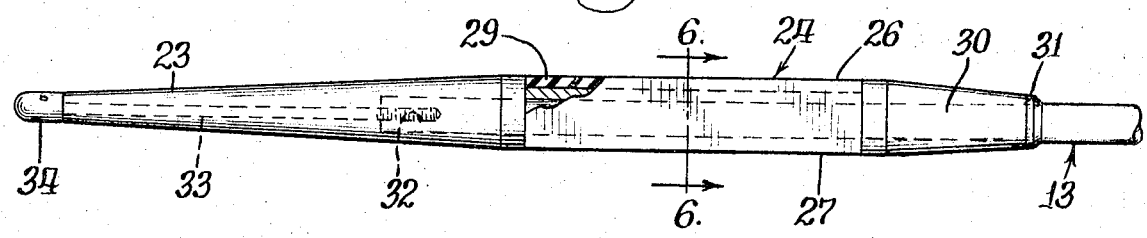

SPINDLE FOR FRUIT PICKER

BACKGROUND OF THE INVENTION

1. Field of the Invention

The present inventor was and is a pioneer in the development of fruit pickers of the type to engage and twist the fruit to cause a separation of the fruit from the tree. His development work encompassed whole complex pickers but invariably the pickers required spindles of various conformations and with various fin arrangements thereon to cause separation of the fruit from the tree. However, in his prior machines the spindles and their fruit engaging fins used to accomplish maximum fruit harvesting tended to cause some of the branches to be broken and at times some of the undeveloped fruit to be dislodged. The present invention is to make the panel of spindles more open and spread out for easy tree penetration without causing damage to the branches or to the green fruit. The single lobed cams on the rotating spindles and the use of a plurality of stationary spindles in lieu of all rotating spindles has materially reduced the area of agitation or friction caused by previous fruit picking panels without in any way detracting from their maximum harvest of fruit. In fact the single lobed cams operate more efficiently and more positively in engaging and spinning the fruit than anything heretofore known.

2. Description of the Prior Art

For almost 20 years the subject inventor has been pioneering in the mechanical picking of fruit and more particularly citrus fruit. He was the first to envision the mechanical removal of fruit by a twisting action. This is covered by basic U.S. Pat. No. 3,040,507 which issued June 26, 1962.

In a succeeding U.S. Pat. No. 3,129,551 which issued Apr. 21, 1964 the fruit picker was further developed and included a plurality of parallel spindles with certain crop engaging fins mounted on the spindles.

At this point in time the subject inventor attempted to make his principles of picking work in a portable machine and conceived of the alternating penetration and removal of a manipulative panel of fruit picking spindles into a tree. This is shown in U.S. Pat. No. 3,197,952 which issued on Aug. 3, 1965.

U.S. Pat. No. 3,222,855 issued Dec. 14, 1965 and U.S. Pat. No. 3,458,982 issued Aug. 5, 1969. Both of these patents are directed to the shape and particular arrangement of fins on the spindles of a fruit picking panel.

The present invention is a still further development of an arrangement of spindles on a fruit picking panel and including means in the form of cams on certain of the spindles for more efficient fruit grasping and spinning and equally importantly to permit the panel spindles to have easy tree penetration and not to disturb the small green fruit, the bloom, or the leaves. There also results a concurrent reduction in the breakage of pliable living branches but the cammed spindles tend to desirably remove small dead branches.

SUMMARY OF THE INVENTION

A principal object of the present invention is to provide a fruit picker which will mechanically pick fruit from a tree.

An important object of this invention is to provide an efficient mechanical fruit picker in which the trees so picked will compare favorably with manually picked trees.

Another important object of this invention is to provide novel tree penetrating spindles for engaging and effecting the removal of fruit from the tree.

A still further important object of this invention is to provide a novel arrangement of rotating and stationary spindles in a panel of spindles for insertion into the branches of a fruit bearing tree to cause the removal of only the ripe fruit.

Another and still further important object of this invention is to provide a novel panel of fruit picking spindles in which a plurality of rotating spindles are mixed in a certain arrangement with a plurality of stationary spindles and all of the spindles and their fruit engaging portions shaped and spaced to present the least possible obstruction to their insertion and withdrawal into and from the dense branches of a fruit bearing tree.

Still another important object of this invention is to provide a spindle arrangement as defined in the preceding object and in which the fruit engaging elements on the rotating spindles are cams with smoothly tapered nose cones so that when the spindles are inserted into a tree the live, pliable tree branches are gently shifted to permit such insertion and when the spindles have penetrated the surface of the tree the cooperative rotation of the cammed spindles with each other and with the stationary spindles cause a twist removal of the fruit lodged therein.

Other and further important objects and advantages will become apparent from the disclosures in the following specification and accompany drawings.

IN THE DRAWINGS

FIG. 1 is a front elevational view of a fruit picking panel as used in this invention.

FIG. 2 is a side elevational view of the fruit picking panel of FIG. 1.

FIG. 3 is an enlarged side elevational view detail of the rotating spindles of this invention.

FIG. 4 is a sectional view taken on the line 4—4 of FIG. 3.

FIG. 5 is an enlarged side elevational view detail of the stationary spindles of this invention.

FIG. 6 is a sectional view taken on the line 6—6 of FIG. 5.

AS SHOWN IN THE DRAWINGS

Figure 7:
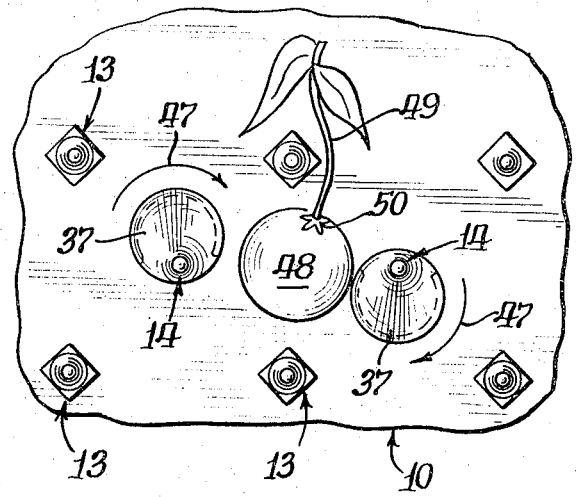
FIG. 7 is an enlarged detail view of a portion of the panel of spindles taken in such a manner as to show the fruit about to be harvested by cooperative cams of closely adjacent rotating spindles.

The reference numeral 10 indicates generally a panel for carrying a plurality of tree penetrating spindles for the harvesting of fruit. The panel is similar to that shown in my prior U.S. Pat. No. 3,458,982 and its structure includes generally vertically disposed spaced apart wall members 11 and 12. As in my prior fruit picking panels the spaced walls are held in fixed relation with respect to each other. A plurality of stationary spindles 13 are arranged in horizontal and vertical rows as best shown in FIG. 1. A plurality of rotating spindles 14 are similarly arranged in horizontal and vertical rows which are inter-spaced between the rows of stationary spindles 13. Bushings or sockets 15 are affixed in the forwardly disposed wall 11 of the panel 10 and receive and hold the stationary spindles therein. Axially aligned sleeve bushings 16 and 17 are provided in the front and rear walls 11 and 12 of the panel 10 to journally receive the ends of the rotating spindles 14.

Sprockets 18 are mounted on the rotating spindles 14 at a position between the spaced apart walls 11 and 12. The sprockets 18 all lie in the same plane and are adapted to receive an endless chain 19 therearound. Thus when the chain 19 is driven all of the shafts 14 are rotated and rotated in the same direction. A portion 20 of one of the spindles 14 extends rearwardly beyond the wall 12 as shown in FIG. 2. This extension is adapted to carry a sprocket 21 thereon. A driving chain 22 is mounted on the sprocket 21 and acts to impart rotation to that particular shaft 14. However, as the rotating spindles 14 are all tied together by reason of the chain 19 all of the spindles 14 will rotate simultaneously in the same direction.

As best shown in FIGS. 2 and 5 the stationary spindles 13 are each provided with smoothly tapered nose cones 23. Also, each stationary spindle is provided with an enlarged generally square shaped central portion 24. This square portion 24 is disposed rearwardly of the nose cone 23. Each corner of the square portion 24 constitutes a fruit harvesting rib as shown at 25, 26, 27 and 28. A square shaped rubber or other elastomer sleeve is snuggly applied over the square portion 24 as best shown in FIGS. 5 and 6. A rearwardly extending tapered portion 30 is located behind the square portion 24. The preferred construction of the stationary spindle as shown in FIG. 5 is to make the operating portions in three separate sections, that is, nose cone 23, central square portion 24, and rear reversely shaped cone 30. These are mounted on the shaft 13 so that the rear cone member 30 abuts a fixed collar 31. The forward end of the shaft 13 is internally threaded as shown at 32 and cooperatively receives an externally threaded end portion of an elongated bolt 33. A bolt head 34 blends or merges into the nose cone 23 and holds the three sections firmly against the collar 31.

Each of the rotating spindles 14 is provided with a smoothly tapered, eccentric nose cone 35. The enlarged rearward end 36 of the nose cone 35 is adapted to abut the forward end of a centrally disposed cam portion 37. The cam portion 37 is circular in cross section as shown in FIG. 4. The axis of the shaft 14 about which the nose cone 35 and the cam portion 37 rotate is shown at 38 in FIG. 4. The cam portion 37 is eccentric or offset relative to the axis 38. The cam comprises a cylindrical sleeve which extends from its juncture at 36 to the nose cone rearwardly to its right angle rear wall 39.

A rubber or elastomer blanket type of insert 40 of circular shape is provided around the central major portion of the cylindrical cam as shown in FIGS. 3 and 4. The rubber blanket 40 is set in a recess 41 in the surface of the metal cam 37. The combination metal and rubber cam element 37 thus presents a smooth outer surface to the tree to be harvested. Therefore when the panel of spindles enters the canopy of the tree it gently pushes branches aside and simultaneously separates clusters of fruit to guide the individual fruit into the picking area. A fixed collar 43 is provided on the shaft 14 and acts to hold one end of the series of elements consisting of the sleeved rearwardly didposed cone 42, cylindrical cam 37, and nose cone 35. The forward end of the shaft 14 is internally threaded as shown at 44. An elongated bolt 45 has its shank end threadedly cooperating with the internal threads 44 of the spindle 14. A head 46 is provided on the outer end of the bolt 45 and acts to hold the three sleeve elements in fixed position on the shaft 14 against the stationary collar 43. The bolt head 46 forms a smooth continuation of the nose cone so there are no obstructions on the spindle to impair easy tree penetration.

The direction of rotation of the rotating spindles 14 is identified by the arrows 47 in FIGS, 1, 7, 8, 9 and 10.

Figure 8:
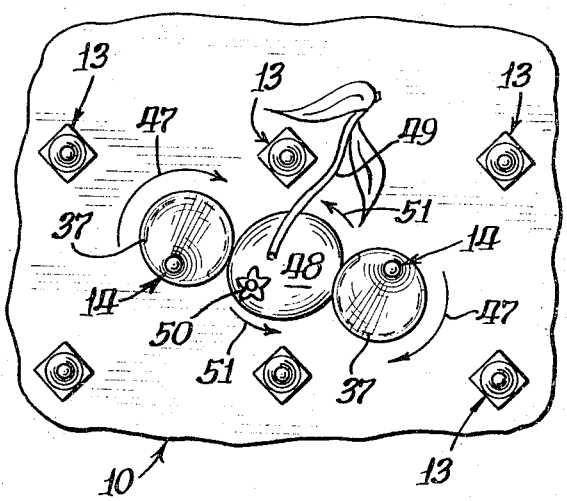
FIG. 8 is a view similar to FIG. 7 with the spindles further rotated and having the cam portions of the spindles engaging the fruit to be harvested in a twisting action causing the removal of the fruit from its stem.
Figure 11:
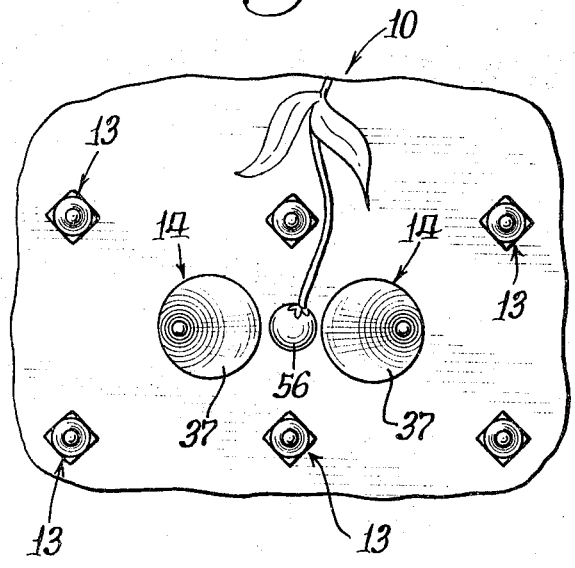
FIG. 11 is an enlarged detail view of a portion of the spindle panel with the adjacent surfaces of the cammed portions of the spindles in their closest proximity and showing the smaller, green fruit loosely disposed therein.
Figure 12:
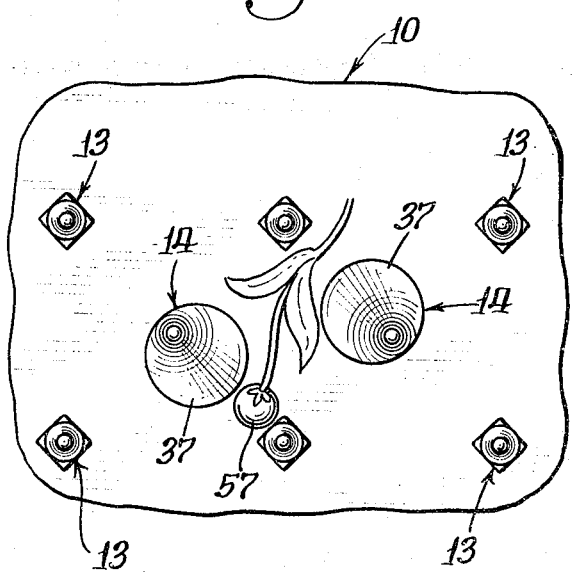
FIG. 12 is an enlarged detail view of a portion of the spindle panel with the surfaces of the cammed portions of the spindles in their closest proximity to the stationary spindles and showing a smaller, green fruit loosely disposed therein.

FIGS. 7 and 8 depict a fruit 48, such as an orange or grapefruit, or the like, hanging on a stem 49. It is in this area of the tree that the panel 10 has its spindles, both stationary and rotating, inserted for the harvesting of the tree ripened fruit. In FIG. 8 the calyx 50 of the citrus fruit 48 is clearly shown as the fruit has been severed from its stem by a twisting or spinning action. In FIG. 7 the cam portions 14 of the adjacent rotating spindles 14 are widely spaced apart but upon rotation in the direction of the arrows 44 these raised cam portions commence closing the gap between the spindles so that the fruit 48 therebetween will be pinched as shown in FIG. 8. The action is in fact a rolling pinching action causing the fruit 48 to be spun around about itself in the direction of the arrows 51. The fruit spinning is opposite to the direction of rotation of the rotating spindles 14 and creates a gentle twisting of the fruit from its stem leaving the calyx 50 intact and untorn. The whole action simulates the action of hand picking. When the cams are widely spaced apart as shown in FIG. 7 spindles easily penetrate the tree branches without damaging the branches or the fruit hanging therein. Now when the cams are rotated the fruit 48 is gradually gripped and as the spindles continue to rotate the ripe fruit is twisted loose from its attachment to the tree. As shown in FIGS. 11 and 12 when the fruit is small and undeveloped the engagement by the cams is not sufficient to remove it and it remains unimpaired for continued growth and picking the next time the harvester passes. The picking of the fruit in FIGS. 7 and 8 shows how picking is accomplished by adjacent rotating spindles.

Figure 9:
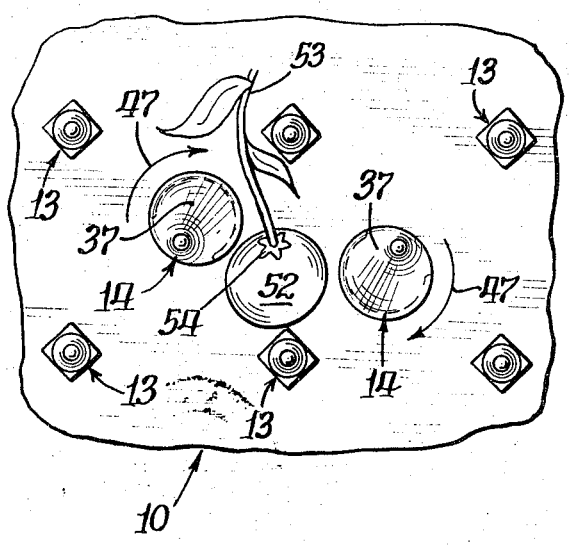
FIG. 9 is an enlarged detail view similar to FIG. 7 showing the fruit in another position and one in which it will naturally be engaged between the cam of a rotating spindle and a stationary spindle.
Figure 10:
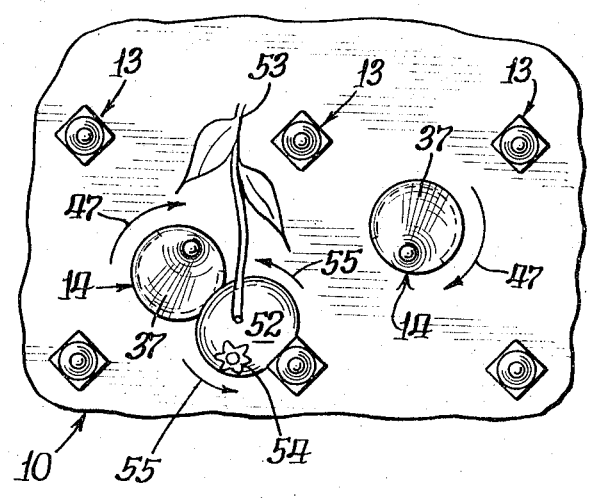
FIG. 10 is a view similar to FIG. 8 showing the rotating spindles rotated relative to their positions in FIG. 9 and causing the fruit to be engaged between the cam of one rotating spindle and a stationary spindle for effectively spinning or twisting the fruit causing a picking and removing of that fruit.

In FIGS. 9 and 10 the picking is accomplished by the cooperation of a rotating spindle 14 with a stationary spindle 13. Here a citrus fruit 52 is hanging from a stem 53 at a position slightly lower than the fruit 48 of FIGS. 7 and 8. In this position the adjacent cams of two rotating spindles tend not to grab the fruit but rather push it downwardly to where it is gripped between the one rotating spindle and a stationary spindle. One corner of the square center portion of the stationary spindle acts as a pivot point or line about which the fruit is spun or twisted by the rotating of the cam on the cooperative rotating spindle. The fruit is thus severed from the stem 53 at the position of its attachment to the fruit at the calyx 54. The fruit is rotated by the rolling action of the cam in the direction of the arrows 55 and again this is opposite to the direction of rotation of the rotating spindles with their fruit gripping cams.

In the harvesting of the fruit by the actions described in FIGS. 7, 8, 9 and 10 there is no damage caused to the fruit during picking as the action of the cams is gentle. Further the rubber coverings of both the rotating spindles and the stationary spindles provide the necessary cushions for the fruit during the twisting operation. Also, the rubber surface 40 of the cams provides sufficient friction with the fruit to cause the fruit to be rotated as indicated in both of FIGS. 8 and 10.

FIGS. 11 and 12 show the interengagement of the picking spindles with small, green fruit. The adjacent rotating spindles 14 have their cammed portions 37 rotated in FIG. 11 to the position where they are closest to each other which for convenience we will call maximum proximity. A small green citrus fruit 56 is shown hanging between the cam surfaces and yet there is sufficient space to prevent contact by both cams simultaneously. Hence, the unripened fruit remains on the tree, undamaged despite the fact the tree is being stripped of its full grown fruit at this same time. Now, as shown in FIG. 12, the rotating spindles 14 have moved to a position comparable to that of FIG. 8 and again a small green fruit 57 is shown positioned between the cam 37 and a stationary spindle 13. The maximum proximity of the rotating and stationary spindles is still great enough to avoid any pulling of the small fruit.

Figure 13:
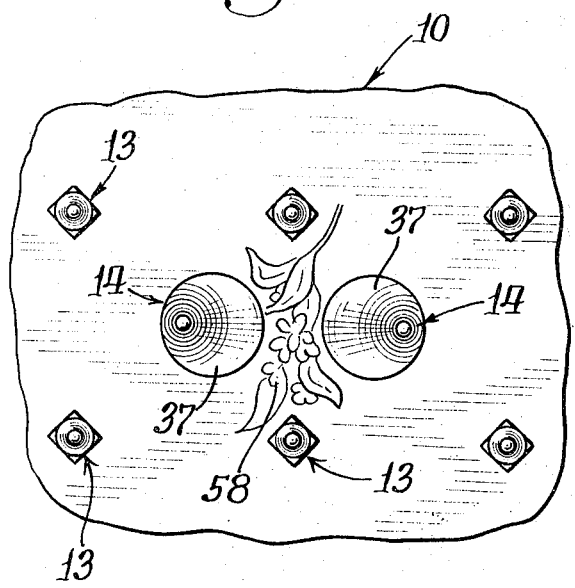
FIG. 13 is an enlarged detail view of a portion of the spindle panel with the adjacent surfaces of the cammed portions of the spindles in their closest proximity and showing the tree bloom loosely disposed therebetween.
Figure 14:
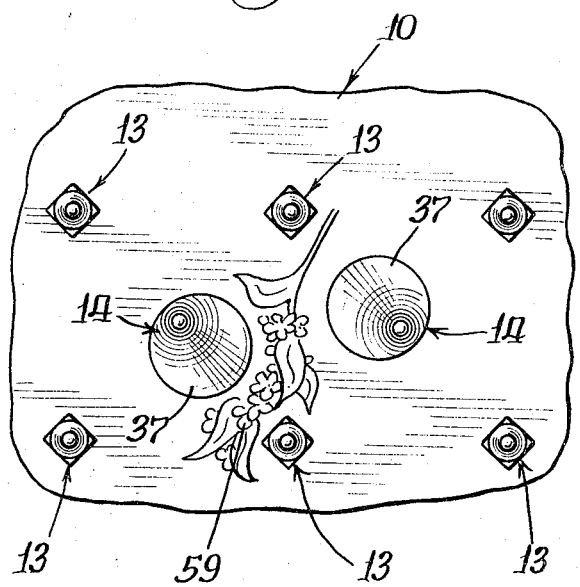
FIG. 14 is an enlarged detail view of a portion of the spindle panel with the surfaces of the cammed portions of the spindles in their closest proximity to the stationary spindles and showing the tree bloom loosely disposed therebetween.

FIGS. 13 and 14 depict the relationship of the fruit harvesting spindles with the tree bloom. FIG. 13 again shows the cams 37 in their maximum proximity with a bloom 58 hanging therebetween and not being damaged. FIG. 14 shows a tree bloom 59 hanging between a rotating spindle 14 and a stationary spindle 13 in its maximum proximity and still having sufficient clearance so there is no impairment of that bloom or the tree leaves and hence the future crop of citrus fruit will continue its normal growth.

THE OPERATION

When the fruit picking panel 10 is located adjacent a tree to be harvested it has its plurality of rotating and stationary spindles inserted into the tree to effect a picking of the fruit growing on the tree. The gradually increasing diameter of the combination eccentric nose cone and the cam of the rotating spindles as well as the cone shaped noses of the stationary spindles push the branches aside to facilitate entry of the entire panel into the canopy of the plant or tree. The spindles act to separate clusters of fruit and guide them into the picking area which is created by the cooperating adjacent rotating spindles as depicted in FIGS. 7 and 8 and the cooperating spindles and stationary spindles as depicted in FIGS. 9 and 10. As previously indicated the rubber coverings of the spindles protect the fruit from damage during picking and at the same time provide the friction necessary to accomplish fruit removal. The stationary spindles being square in their picking sections provide four tractional surfaces for the engagement of fruit as the cams 37 of the rotating spindles move toward and away from the stationary spindles. The entire spindles are designed with sufficient resiliency to allow fruit to be removed by a twisting action without exerting damaging pressure to the periphery of the fruit. And, at maximum proximity of adjacent cams, and cams and stationary spindles the smaller green fruit, the bloom and the leaves of the tree are undamaged because of their size. I am aware that herein is provided a fruit picker which permits easy insertion of picking spindles into the surface of a tree without damaging the tree or its fruit and when the spindles are in the confines of the tree the fruit hanging in the area of the spindles is carefully picked. Although the spindles are spaced apart substantially to provide much open area, the utilization of cams on the rotating spindles insures the closing of the gaps and the positive engagement of the fruit for a twist removal of the fruit from the tree. The details of construction may be varied without departing from the principles disclosed herein and I therefore do not propose limiting the patent granted hereon otherwise than as necessitated by the appended claims.

What is claimed is:

1. A fruit harvesting panel comprising a plurality of tree penetrating spindles mounted in a certain arrangement on one side thereof, certain of said spindles being stationary, certain of said spindles being rotatable and widely spaced apart each of the rotating spindles having a cam mounted thereon constituting a fruit harvesting area, each of said cams comprising smooth cylindrical cammed surfaces arranged on said rotating spindles, means for rotating all of the rotatable spindles in one direction for alternatively forming between adjacent rotating spindles on the panel a wide and a narrow gap, whereby when the panel of spindles is inserted into a tree the arrangement of spindles is such that fruit hanging in the area of the cams on the spindles will upon the spindles being rotated be pushed against and thereby gripped and gently twisted by the cooperation of the cylindrical cammed surfaces of two adjacent rotating spindles as the cams close the gap between the spindles or engaged and twisted by the cooperative engagement of the cylindrical cammed surface of one rotating spindle and a stationary spindle.

2. A fruit harvester as set forth in claim 1 in which a rubber blanket is provided over the cylindrical cammed surface of each of the rotating spindles.

3. A fruit harvester as set forth in claim 1 in which a portion of each of the stationary spindles located adjacent the harvesting area of the rotating spindles comprises a plurality of spaced apart fruit harvesting ribs.

4. A fruit harvester as set forth in claim 3 in which a rubber sleeve is provided over each of the ribbed stationary spindles.

5. A fruit harvester as set forth in claim 1 in which a harvesting area of each of the stationary spindles is square in cross section.

6. A fruit harvester as set forth in claim 5 in which a rubber blanket is provided over the cylindrical cammed surface of each of the rotating spindles and a rubber sleeve is provided over the square harvesting area of the stationary spindles.

7. A rotating fruit picking spindle for a mechanical fruit harvester comprising a shaft, plural sleeve elements carried on said shaft, means locking said plural sleeve elements to said shaft, said sleeve elements comprising a rearwardly tapering cone, a cylindrical eccentric cam and an eccentric forwardly tapering nose cone, said means locking said plural sleeve elements onto said shaft comprising said shaft having a fixed collar at one end, an internally threaded outer end, and a cooperative elongated bolt threadedly engaging said internally threaded outer end, said bolt having an enlarged head to abut the nose cone and hold the plural sleeve elements on the shaft against the fixed collar.

* * * * *